US008458483B1

(12) United States Patent
Bailey et al.

(10) Patent No.: US 8,458,483 B1
(45) Date of Patent: Jun. 4, 2013

(54) TECHNIQUES FOR MESSAGE-PASSING USING SHARED MEMORY OF AN RF TAG

(75) Inventors: Daniel Bailey, Pepperell, MA (US); Marco Ciaffi, Sudbury, MA (US); William Duane, Westford, MA (US); Ari Juels, Brookline, MA (US); John O'Brien, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 884 days.

(21) Appl. No.: 12/495,447

(22) Filed: Jun. 30, 2009

(51) Int. Cl.
*G06F 21/00* (2006.01)
*G06F 12/14* (2006.01)

(52) U.S. Cl.
USPC ........... 713/182; 713/168; 713/185; 713/190; 713/193; 340/10.1; 340/10.33; 340/10.34; 340/572.1

(58) Field of Classification Search
USPC ................. 713/168, 171, 192, 193, 182, 185, 713/190; 340/10.1, 10.33, 10.34, 572.1
See application file for complete search history.

(56) References Cited

U.S. PATENT DOCUMENTS

| 5,966,082 | A  | * | 10/1999 | Cofino et al. | .............. | 340/10.51 |
| 6,970,070 | B2 |   | 11/2005 | Juels et al. |   |   |
| 7,298,243 | B2 |   | 11/2007 | Juels et al. |   |   |
| 7,443,301 | B2 |   | 10/2008 | Tucker et al. |   |   |
| 7,450,010 | B1 | * | 11/2008 | Gravelle et al. | ............ | 340/572.1 |
| 7,565,698 | B2 | * | 7/2009 | Isozaki et al. | ................... | 726/26 |
| 7,576,657 | B2 |   | 8/2009 | Duron et al. |   |   |
| 7,584,885 | B1 | * | 9/2009 | Douglass | ...................... | 235/379 |
| 7,649,460 | B2 |   | 1/2010 | Rodgers |   |   |
| 7,733,227 | B1 | * | 6/2010 | Pesavento et al. | ......... | 340/572.1 |
| 2003/0104848 | A1 | * | 6/2003 | Brideglall | ..................... | 455/574 |
| 2007/0039041 | A1 | * | 2/2007 | Davis | ................. | 726/5 |
| 2010/0052854 | A1 | * | 3/2010 | Jeun | ............................ | 340/5.85 |

OTHER PUBLICATIONS

"eSTREAM," The ECRYPT Stream Cipher Project, retrieved from http://web.archive.org/web/20060206211952/www.ecrypt.eu.org/stream/, May 24, 2010.
Avoine et al, "Reducing Time Complexity in RFID Systems," in B. Preneel and S. Tavares, editors, Selected Areas in Cryptography—SAC 2005, Lecture Notes in Computer, Springer-Verlag, 2005, 16 pages.
Bono et al., "Security Analysis of a Cryptographically-Enabled RFID Device," in 14th USENIX Security Symposium, pp. 1-15, P. McDaniel, editor, USENIX Association, 2005.
Feldhofer et al., "Strong Authentication for RFID Systems Using the AES Algorithm," Workshop on Cryptographic Hardware and Embedded Systems—CHES '04, vol. 3156 of Lecture Notes in Computer Science, pp. 357-370, Springer-Verlag, 2004.

(Continued)

*Primary Examiner* — Yin-Chen Shaw
(74) *Attorney, Agent, or Firm* — BainwoodHuang

(57) ABSTRACT

A technique of message-passing using shared memory of an RF tag involves storing a message in the shared memory while a security processor of the RF tag is in a sleep mode, the security processor being constructed and arranged to access the shared memory when the security processor is in a wakened mode. The technique further involves transitioning the security processor from the sleep mode to the wakened mode, and processing the message from the shared memory using the security processor after the security processor has transitioned from the sleep mode to the wakened mode. If the security processor is awakened only as needed (rather than remain in the wakened mode), lifetime of a battery which powers the security processor can be maximized.

15 Claims, 5 Drawing Sheets

OTHER PUBLICATIONS

Fishin et al., "Some Methods for Privacy in RFID Communication," in 1st European Workshop on Security in Ad-Hoc and Sensor Networks (ESAS 2004), Intel Research Seattle Tech Memo IRS-TR-04-010, pp. 1-13, Jun. 2004.

Golle et al, "Universal Re-encryption for Mixnets," in T. Okamoto, editor, RSA conference—Cryptographers' Track (CT-RSA), vol. 2964 of Lecture Notes in Computer Science, pp. 163-178, Springer-Verlag, 2004. 17 pages (repaginated) submitted.

"EPCglobal: Specification for RFID Air Interface: EPC™ Radio-Frequency Identity Protocols Class-1 Gneration-2 UHF RFID Protocol for Communications at 860 MHz-960 MHz," Version 1.0.9, pp. 1-94, Jan. 2005, available online at http://www.gs1.org/gsmp/kc/epcglobal/uhfc1g2/uhfc1g2_1_0_9-standard-20050126.pdf.

Juels, Ari, "Minimalist Cryptography for Low-Cost RFID Tags," in C. Blundo and S. Cimato, editors, The Fourth International Conference on Security in Communication Networks—SCN 2004, vol. 3352 of Lecture Notes in Computer Science, pp. 149-164, Springer-Verlag, 2004. 29 pages (repaginated) submitted.

Juels, Ari, "'Yoking-Proofs' for RFID Tags," in R. Sandhu and R. Thomas, editors, Workshop on Pervasive Computing and Communications Security—PerSec 2004, pp. 138-143, IEEE computer Society, 2004.

Juels, Ari, "Strengthening EPC Tags Against Cloning," in ACM Workshop on Wireless Security (WiSe), pp. 67-76, ACM Press, 2005. 17 pages (repaginated) submitted.

Juels, Ari, "RFID Security and Privacy: A Research Survey," Journal of Selected Areas in Communication (J-SAC), 24(2):381-395, Feb. 2006. 19 pages (repaginated) submitted.

Juels et al., "The Blocker Tag: Selective Blocking of RFID Tags for Consumer Privacy," in V. Atluri, editor, 8th ACM Conference on Computer and Communications Security, pp. 103-111, ACM Press, Washington, D.C. 2003.

Juels et al., "High-Power Proxies for Enhancing RFID Privacy and Utility," in G. Danezis and D. Martin, editors, Privacy Enhancing Technologies (PET) Workshop, pp. 210-226, 2005.

Juels et al., "Authenticating pervasive Devices with Human Protocols," in Advances in Cryptology—CRYPTO 2005, pp. 293-308, Springer-Verlag, 2005, Lecture Notes in Computer Science, vol. 3621.

Karjoth et al., "Disabling RFID Tags with Visible Confirmation: Clipped Tags are Silenced," in S. DeCapitani di Vimercati and R. Dingledine, editors, Workshop on Privacy in the Electronic Society (WPES), pp. 27-30, 2005, Alexandria, VA.

Molnar et al., "Privacy for RFID Through Trusted Computing," in S. DeCapitani di Vimercati and R. Dingledine, editors, Workshop on Privacy in the Electronic Society (WPES), pp. 31-34, 2005, Alexandria, VA.

Molnar et al., "Privacy and Security in Library RFID Issues, Practices, and Architectures," in B. Pfitzmann and P. McDaniel, editors, ACM Conference on Communications and Computer Security, pp. 210-219, ACM Press, 2004, Washington, DC.

Rieback et al., "RFID Guardian: A Battery-Powered Mobile Device for RFID Privacy Management," in Colin Boyd and Juan Manuel Gonzalez Nieto, editors, Australasian conference on Information Security and Privacy—ACISP 2005, vol. 3574 of Lecture Notes in Computer Science, pp. 184-194, Springer-Verlag, 2005.

Staake et al., "Extending the EPC Network—The Potential of RFID in Anti-Counterfeiting," in ACM Symposium on Applied Computing, pp. 1607-1612, ACM Press, 2005, Santa Fe, New Mexico.

Vajda et al., "Lightweight Authentication Protocols for Low-Cost RFID Tags," in Second Workshop on Security in Ubiquitous Computing—Ubicomp 2003, 10 pages.

"eSTREAM," The ECRYPT Stream Cipher Project, retrieved from http://web.archive.org/web/20060703222846/www.ecrypt.eu.org/stream/, May 24, 2010.

"eSTREAM Phase 2," The ECRYPT Stream Cipher Project—Phase 2, retrieved from http://web.archive.org/web/20061011122323/www.ecrypt.eu.org/stream/, May 24, 2010.

* cited by examiner

TECHNIQUES FOR MESSAGE-PASSING USING SHARED MEMORY OF AN RF TAG

BACKGROUND

In general, radio frequency identification (RFID) involves an exchange of radio frequency (RF) signals between an RFID interrogation system and a mobile RFID device for identification and/or tracking purposes. The RFID interrogation system typically includes a transceiver, which is commonly called an RFID reader, and a controller. When the mobile RFID device which is commonly called an RFID tag moves within range of the RFID reader, the RFID tag receives power in a wireless manner from the RFID reader. While the RFID tag receives such power, the controller is able to write data to and read data from the RFID tag through the RFID reader.

An example of an RFID tag is an electronic product code (EPC) tag (or label) which accompanies a shipping item within a supply chain. At various points along the supply chain, RFID readers communicate with the EPC tag to help identify and track the location of the shipping item.

EPCglobal is a consortium of governing/corporate-style entities involved in standardizing and promoting widespread use of EPC technology. One such standard is EPCglobal UHF Class 1 Gen 2 (commonly referred to as the "Gen 2" standard) which is an air interface protocol.

SUMMARY

Unfortunately, there are deficiencies with the above-described conventional EPC tags. For example, conventional EPC tags are often poorly endowed as security devices. That is, limits on available power, either via wireless power transmission or from batteries sealed within the EPC tags, impose computing/processing limitations on the electronics within the EPC tags. Accordingly, cryptographic approaches employed by the EPC tags are often restricted in complexity and sophistication. As a result, EPC tag manufacturers typically provide cryptographically-enabled tags which use substantially weakened or proprietary encryption schemes.

In contrast to above-described conventional EPC tags, improved techniques involve message-passing using shared memory within an RF tag. In particular, an RF transceiver within the RF tag is able to derive power from an external RF reader and, based on interaction with the RF reader, store a message in the shared memory while a security processor of the RF tag resides in a low-power sleep mode. At some later time, the security processor awakens from the low-power sleep mode (e.g., in response to an authenticated activation signal from the RF transceiver) and processes the message using power from a battery within the RF tag. Accordingly, the RF transceiver circuit and the security processor are able to effectively communicate with each other thus enabling the RF tag to enjoy processor capabilities (e.g., the security processor can perform cryptographically-strong authentication operations while awake and operating under battery power). Moreover, since the security processor eventually transitions back to the low-power sleep mode, the life of the battery is extended thus enabling the RF tag to operate effectively for many years.

In one embodiment, a technique of message-passing using shared memory of an RF tag device involves storing a message in the shared memory while a security processor of the RF tag device is in a sleep mode, the security processor being constructed and arranged to access the shared memory when the security processor is in a wakened mode. The technique further involves transitioning the security processor from the sleep mode to the wakened mode, and processing the message from the shared memory using the security processor after the security processor has transitioned from the sleep mode to the wakened mode. If the security processor is awakened only as needed (rather than remain in the wakened mode), lifetime of a small battery which powers the security processor can be maximized.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves message-passing using shared memory within an RF tag. Along these lines, an RF transceiver within the RF tag is able to derive power from an external RF reader and, based on interaction with the RF reader, store a message in the shared memory while a security processor of the RF tag resides in a low-power sleep mode. At some later time, the security processor awakens from the low-power sleep mode (e.g., the RF transceiver wakes up the security processor) and processes the message using power from a battery within the RF tag. The RF tag thus enjoys the availability of a processor (e.g., to perform cryptographic operations for secure authentication) which is able to robustly and reliably communicate with the RF transceiver through the shared memory. Furthermore, since the security processor eventually transitions back to the low-power sleep mode, the life of the battery is effectively extended.

Figure 1:
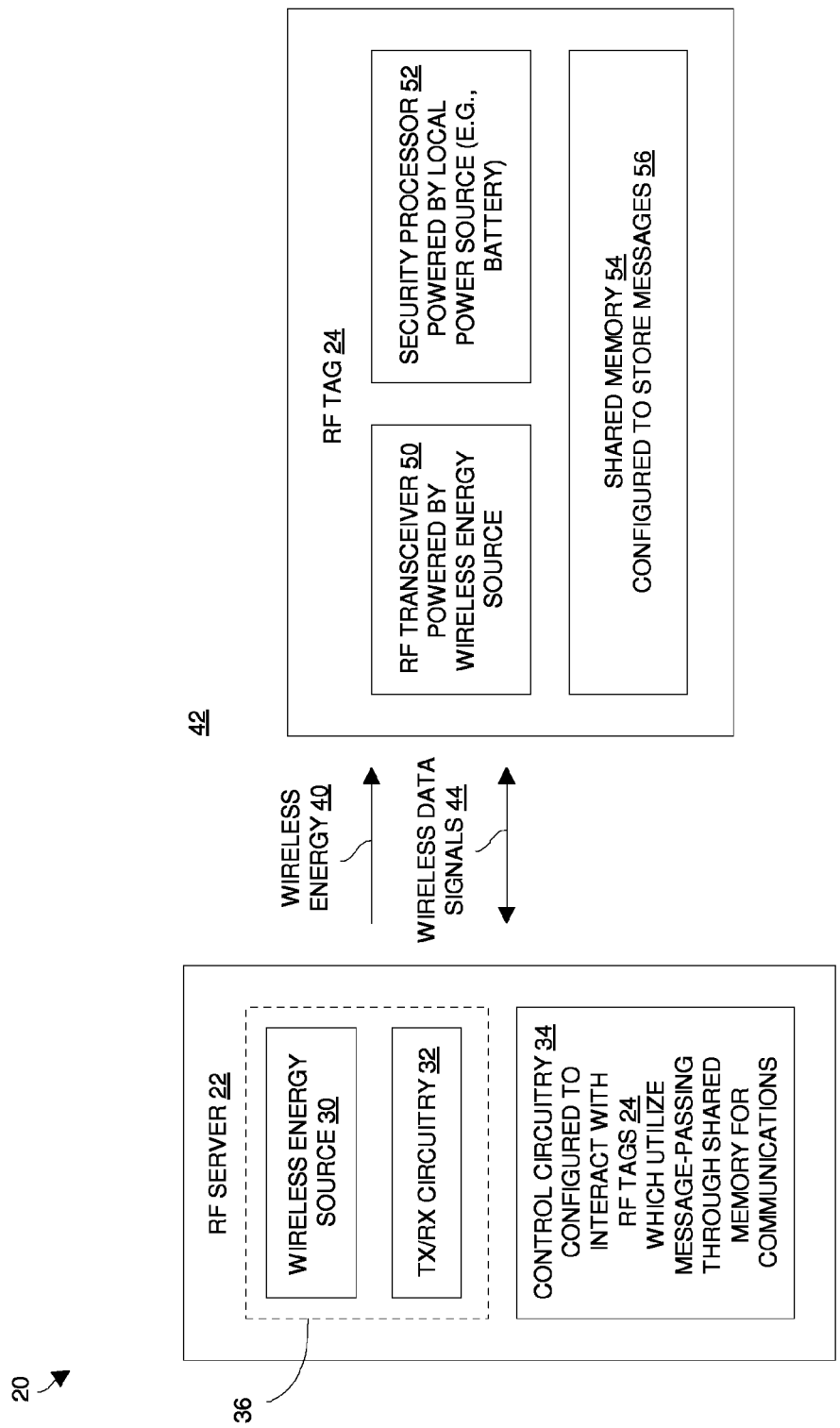
FIG. 1 is a block diagram of an electronic system which utilizes message-passing through shared memory of an RF tag.

FIG. 1 shows a radio frequency (RF) tag system 20 which utilizes message-passing through shared memory. The RF tag system 20 includes an RF server 22 and an RF tag 24. The RF server 22 includes a wireless energy source 30, transmit/receive circuitry 32, and control circuitry 34. Although only one RF tag 24 is shown in FIG. 1 for simplicity, the wireless energy source 30 and the transmit/receive circuitry 32 form an RF reader 36 which is capable of effectively communicating with multiple RF tags 24. That is, the wireless energy source 30 is configured to provide power 40 (i.e., wireless energy transfer) to each RF tag 24 when the RF tag 24 comes within an activation range 42 (i.e., generally illustrated by the reference number 42). While the RF tag 24 is proximate to the RF reader 36 within this activation range 42 (e.g., within a few inches), the transmit/receive circuitry 32 of the RF reader 36 is configured to exchange wireless data signals 44 with each RF tag 24 on behalf of the control circuitry 34 (e.g., a back-end server, an authentication server, combinations thereof, etc.).

As further shown in FIG. 1, the RF tag 24 includes an RF transceiver 50, a security processor 52, and shared memory 54. The RF transceiver 50 and the security processor 52 have different duty cycles and are powered by different sources. In particular, the RF transceiver 50 (e.g., a passively-powered air interface) obtains energy 40 from the wireless energy source 30 of the RF server 22. In contrast, the security processor 52 derives power locally (e.g., from a small battery) but is capable of transitioning between a wakened mode and a low-power sleep mode to conserve power. Nevertheless, as will be explained in further detail below, the RF transceiver 50 and the security processor 52 are capable of effectively communicating with each other by passing messages 56 through the shared memory 54.

It should be understood that the shared memory 54 is shared in the sense that both the RF transceiver 50 and the security processor 52 share read/write access to the memory 54. In particular, specialized circuitry of the RF transceiver 50 can write messages 56 (i.e., shared data) into the shared memory 54 and read messages 56 from the shared memory 54 (e.g., in response to interaction with the RF reader 36 of the RF server 22). Similarly, the security processor 52 can write messages 56 into the shared memory 54 and read messages 56 from the shared memory 54.

In some arrangements, the RF transceiver 50 includes a memory controller which coordinates access to the shared memory 54 by both the specialized circuitry of the RF transceiver 50 as well as the security processor 52. In these arrangements, the specialized circuitry of the RF transceiver 50 directly accesses the shared memory 54, while the security processor 52 accesses the shared memory 54 indirectly through the memory controller of the RF transceiver 50. Such arrangements enable the memory controller to be packaged with the RF transceiver 50.

In other arrangements, the security processor 52 includes a memory controller which coordinates access to the shared memory 54 by both the specialized circuitry of the RF transceiver 50 and the security processor 52. Here, the security processor 52 directly accesses the shared memory 54, while the specialized circuitry of the RF transceiver 50 accesses the shared memory 54 indirectly through the memory controller of the security processor 52. Such arrangements remove the burden of packaging the memory controller with the RF transceiver 50, as well as allow the security processor 52 to exchange data with the shared memory 54 independently with respect to the RF transceiver 50.

In yet other arrangements, the shared memory 54 has multiple ports (e.g., dual ports) and each of the RF transceiver 50 and the security processor 52 is equipped with a respective memory controller. Accordingly, both the RF transceiver 50 and the security processor 52 are capable of accessing the shared memory 54 directly.

To coordinate access to the shared memory 54 and to protect data coherency, the appropriate circuits within the RF tag 24 are configured to employ standard memory locking/management schemes. Examples of suitable coordination mechanisms include semaphores, memory barriers, various inter-process communications (IPC) techniques, etc.

With the presence of the security processor 52 within the RF tag 24, one will appreciate the enhanced computing/processing capabilities which are available to the RF tag 24. For example, while the security processor 52 is in the wakened mode (i.e., a nominal operational status which can be triggered by an event, a clock, and/or other stimulus), the security processor 52 is capable of performing strong cryptographic operations involved in authenticating the RF server 22 and the RF tag 24 to each other, as well as other useful compute-intensive routines. Additionally, after the security processor 52 completes its designated tasks, the security processor 52 can transition from the wakened mode back to the low-power sleep mode where it can spend most of its time thus enabling the RF tag 24 to operate for many years on a small battery. Further details of a suitable arrangement for the RF tag 24 will now be provided with reference to FIG. 2.

Figure 2:
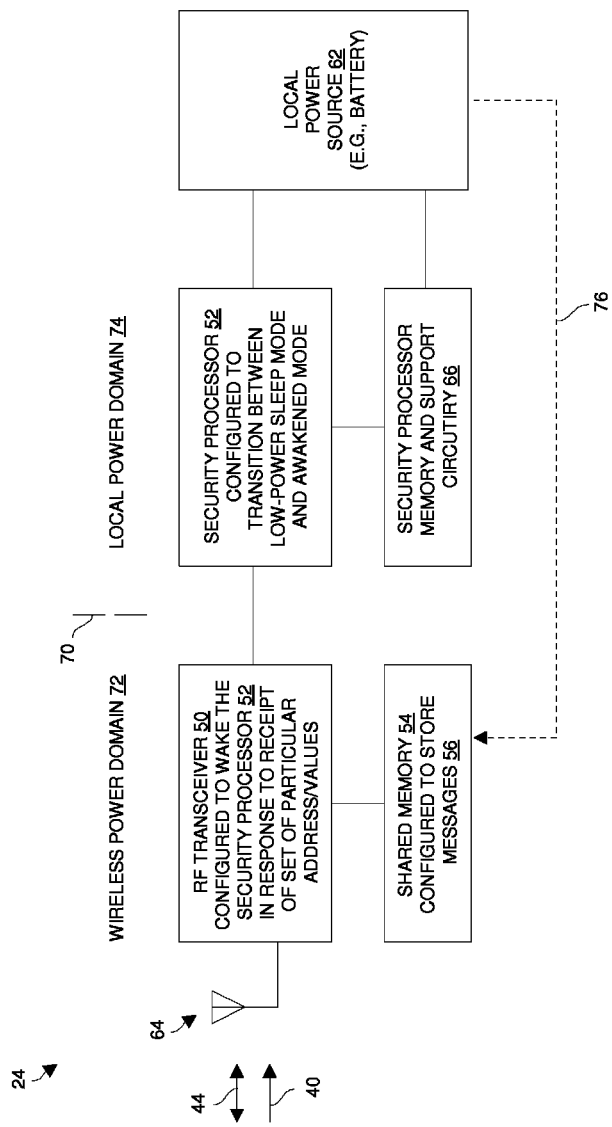
FIG. 2 is a block diagram of the RF tag of FIG. 1.

FIG. 2 shows a suitable arrangement for the RF tag 24. In addition to the RF transceiver 50, the security processor 52 and the shared memory 54 shown in FIG. 1, the RF tag 24 further includes a local power source 62, an antenna 64 and additional memory and support circuitry 66 for the security processor 52. Preferably, the local power source 62 includes a set of batteries or cells (e.g., one or more long-life lithium batteries). The antenna 64 connects to the RF transceiver 50 thus enabling the RF transceiver 50 to exchange the wireless data signals 44 with the RF reader 36, and perhaps assist in gathering the wireless energy 40 (e.g., a previously agreed-upon frequency, also see FIG. 1). The additional memory and support circuitry 66 refers to local storage (e.g., firmware, operating parameters, seeds/keys, etc.), registers, counters, clocks, input/output (I/O) components, and other circuitry that direct and enable the security processor 52 to carry out particular operations of the RF tag 24.

As shown by the dashed line 70, the RF transceiver 50 operates in a wireless power domain 72 since it derives wireless power 40 from the RF server 22 when moved proximate to the RF reader 36 (FIG. 1). In contrast, the security processor 52 as well as the additional memory and support circuitry 66 operate in a local power domain 74 since these components derive power from the local power source 62.

By way of example, the shared memory 54 resides in the wireless power domain 72 and thus derives power from the RF reader 36. Such arrangements are less burdensome on the local power source 62 and thus maximize lifetime of the local power source 62.

Nevertheless, in some arrangements, the local power source 62 supplies local power 76 to the shared memory 54 if needed. Such arrangements enable the security processor 52 to access the shared memory 54 even when the RF tag 24 is out of the activation range 42 of the RF reader 36. This option is illustrated in FIG. 2 by the dashed arrow 76.

Also, by way of example and as shown FIG. 2, the RF transceiver 50 has direct access to the shared memory 54, and the security processor 52 has indirect access to the shared memory 54 through the RF transceiver 50. This situation is well-suited when an RF transceiver chip package includes a memory control circuit and memory, along with an RF transceiver circuit. However, as mentioned earlier, other arrangements and circuit topologies are suitable for use as well (e.g., memory which is controlled directly by the security processor 52, multiport memory, etc.). Further details of the operation of the RF tag system 20 will now be provided with reference to FIG. 3.

Figure 3:
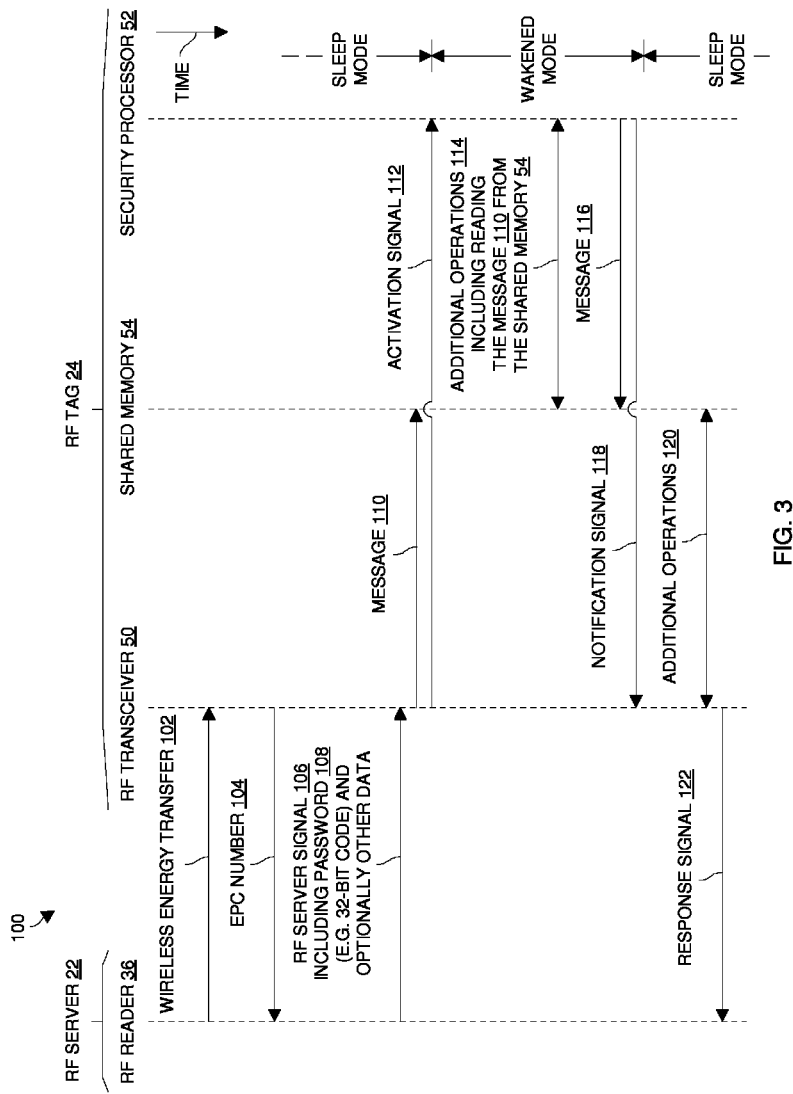
FIG. 3 is a diagram illustrating events and information flowing within the electronic system of FIG. 1.

FIG. 3 is a diagram 100 illustrating events and information flow with the RF tag system 20. For illustration purposes, suppose that the RF tag 24 is configured to operate as an electronic product code (EPC) tag or label. Further suppose that (i) the shared memory 54 is passively powered along with the RF transceiver 50, and (ii) the security processor 52 of the RF tag 24, which is powered by the local power source 62, is initially in a low-power sleep mode in order to conserve power (also see FIG. 2). The events at the top of the diagram 100 occur earlier in time than the events lower in the diagram 100.

Initially, as the RF tag 24 moves into proximity of the RF reader 36 of the RF server 22 (also see the activation range 42 in FIG. 1), the RF transceiver 50 of the RF tag 24 gathers enough wireless energy 40 from the RF reader 36 that it is able to emit an RFID. For example, a user may manually maneuver the RF tag 24 within a few inches of the RF reader 36. As another example, the user may manually maneuver a mobile RF reader 36 adjacent to the RF tag 24. Arrow 102 illustrates wireless power transmission from the RF reader 36 to the RF transceiver 50 of the RF tag 24.

Next, the RF transceiver 50 transmits, as its RFID, a specific EPC number 104 to the RF server 22. The control circuitry 34 of the RF server 22 receives the specific EPC number 104 through the RF reader 36 and generates an appropriate RF server password for the RF tag 24. In some arrangements, this password is based at least in part on the particular EPC number 104 thus enabling the use of different passwords for different EPC numbers.

Then, the RF reader 36 wirelessly sends an RF server signal 106 containing the RF server password 108 from the control circuitry 34 of the RF server 22 to the RF transceiver 50 of the RF tag 24 (also see the wireless signals 44 in FIG. 1). In the context of EPC, such the password 108 can be sent by the RF reader 22 in the form a command to the RF tag 24 (e.g., a write operation) to write a particular value to a particular memory address.

In some arrangements, the password 108 is a 32-bit code that corresponds to the EPC number 104 at least in part. Accordingly, the RF server 22 is able to utilize different passwords for different EPC numbers 104. In these arrangements, specialized detection circuitry within the RF transceiver 50 is preferably pre-programmed with an expected password. Such detection circuitry detects when the RF transceiver 50 receives a correct password 108 which matches the predefined expected password in a manner which is somewhat similar to when a conventional EPC tag receives a 32-bit PIN from an RF reader directing or commanding the conventional EPC tag to deactivate or kill itself.

Upon receipt of the RF server signal 106 containing the RF server password 108, the specialized detection circuitry of the RF transceiver 50 determines whether the RF server password 108 from the RF reader 36 is correct, i.e., whether the RF server password 108 matches an expected password. If the specialized detection circuitry of the RF transceiver 50 determines that the password 108 from the RF reader 36 does not match the expected password, the RF transceiver 50 considers the RF reader 36 to be a rogue reader, and considers the password 108 to be an attack that should be ignored by the RF tag 24.

However, if the password 108 from the RF reader 36 matches the expected password, the specialized detection circuitry of the RF transceiver 50 considers the RF server 22 to have successfully authenticated itself to the RF tag 24 and writes a message 110 to the shared memory 54 which, as mentioned earlier, is also powered by the RF reader 36. The message 110 may include information informing the security processor 52 that authentication with the RF server 22 is successful as well as other data, e.g., extra information obtained from the RF server 22 via the RF server signal 106. At substantially the same time, the RF transceiver 50 provides an activation signal 112 to wakeup the security processor 52.

In response to the activation signal 112, the security processor 52 transitions from the low-power sleep mode (i.e., an inactive or minimally operative state) to a wakened mode (i.e., a nominally operative state) in which the security processor 52 is able to perform compute-intensive operations. Once the security processor 52 is in the wakened mode, the security processor 52, which derives power from the local power source 62, reads and processes the message 110 from the shared memory 54 as illustrated by the double arrow 114.

In some arrangements and as illustrated by the double arrow 114, the security processor 52 may further interact with the shared memory 54 (e.g., perform subsequent read and/or write operations). For example, the security processor 52 can read information from the shared memory 54 and render that information to a user through a display or similar I/O device (also see the additional memory and support circuitry 66 in FIG. 2). As another example, the security processor 52 can write information to the shared memory 54 such as user input from a button or similar I/O device, sensor readings, diagnostic data, etc.

Eventually, the security processor 52 writes another message 116 to the shared memory 54 and sends a notification signal 118 to the RF transceiver 50. The notification signal 118 notifies the RF transceiver 50 to access the message 116 from the shared memory 54. The reply message 116 may contain a result of processing the initial message 110 by the security processor 52, information for the RF transceiver 50 and/or information for the RF server 22.

In response to the notification signal 118, the RF transceiver 50 reads and processes the message 116 from the shared memory 54. In some arrangements, the RF transceiver 50 may further interact with the shared memory 54 (e.g., perform subsequent read and/or write operations) as illustrated by the double arrow 120 in response to direction indicated by the message 116 from the security processor 52. Examples of some useful tasks will be provided shortly.

At this point, one will appreciate that the shared memory 54 fulfills its role as part of a bidirectional communications pathway between the RF transceiver 50 and the security processor 52. In particular, the RF transceiver 50 provided an initial message 110 to the security processor 52 through the shared memory 54, and the RF transceiver 50 received a reply message 116 from the security processor 52 through the shared memory 54.

After the RF transceiver 50 processes the message 116, the RF transceiver 50 is able to provide a response signal 122 to the RF reader 22 of the RF server 22 based on the message 116 (also see the wireless signals 44 in FIG. 1). The response signal 122 may include information read from the shared memory 54 by the RF transceiver 50 which originated from the security processor 52. This information may include results provided by the security processor 52 such as a response based on advanced operations (i.e., complex or compute intensive operations) by the security processor 52. Additionally or alternatively, such information may include RF tag data such as user input from the I/O device, sensor readings, diagnostic data, etc.

One will also appreciate that, upon receipt of the response signal 122 by the RF server 22, the RF server 22 can perform further operations based on the response signal 122. Along these lines, the various components of the RF tag system 20 are capable of repeating portions of the above-described information exchange thus forming a robust and reliable conduit between the control circuitry 34 of the RF reader 22 (FIG. 1) and the security processor 52. For example, the control circuitry 34 of the RF reader 22 may send a follow-up communication to the RF tag 24 through the RF reader 36 (e.g., see the RF server signal 106) and repeat the sequence of events and information flows to perform further useful work (i.e., see arrows 106 through 122). Some particular enhancements will now be presented.

Restricting Access to the Security Processor

Since the security processor 52 consumes power at a faster rate while in the wakened mode vis-à-vis the low-power sleep mode, the lifetime of the local power source 62 (FIG. 2) can be extended by limiting the amount of time the security processor 52 operates in the wakened mode. Along these lines, the RF transceiver 50 preferably does not inadvertently wake up the security processor 52 as the RF tag 24 strays into the activation ranges of rogue RF readers. Rather, the RF transceiver 50 ideally refrains from waking up the security processor 52 until it has reliably authenticated the RF server 22.

Some RF transceivers 50 have built-in functions to (i) receive a 32-bit value and a memory address of the shared memory 54, (ii) read an actual 32-bit value from a memory location at that memory address, and (iii) output a signal indicating whether the received 32-bit value matches the actual 32-bit value read from the memory location. Such functionality can be utilized for the password checking mechanism of the RF tag system 20.

Moreover, security is capable of being augmented by analyzing multiple 32-bit values and thus effectively extending the password length beyond 32-bits. In particular, the password length is preferably extended so that it is impractical or even impossible for an attacker to try all possible passwords, even if given several days.

Figure 4:
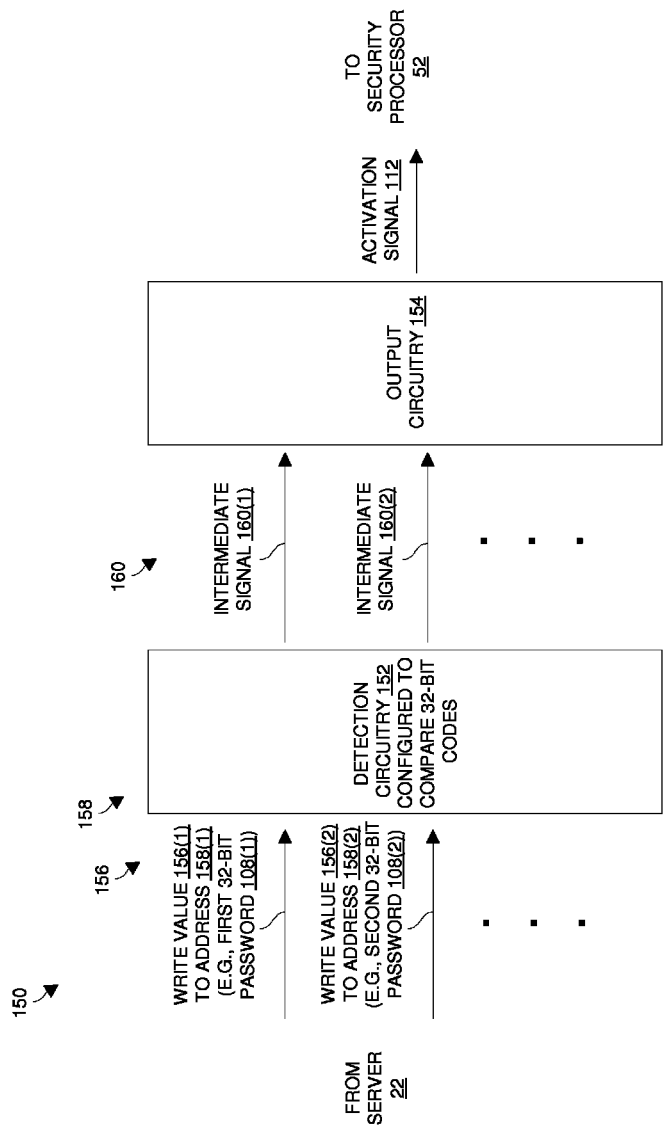
FIG. 4 is a block diagram of particular components of the RF tag of FIG. 1 which are involved in enhancing security.

FIG. 4 shows specialized circuitry 150 which is suitable for use within the RF transceiver 50 to extend a predefined password length conveniently beyond 32-bits. This specialized circuitry 150 requires the RF server 22 to provide an RF server signal 106 containing multiple passwords 108 rather than a single password 108 (also see FIG. 3). As shown in FIG. 4, the specialized circuitry 150 includes detection circuitry 152 and output circuitry 154. The detection circuitry 152 is configured to analyze multiple values 156 (i.e., multiple 32-bit codes) written to multiple memory addresses 158 of the shared memory 54, and provide multiple intermediate signals 160 indicating whether the values 156 and the address 158 match predefined or preprogrammed values and addresses. The output circuitry 154 is configured to provide the activation signal 112 (FIG. 3) to wake up the security processor 52 only when each of the intermediate signals 160 indicates a correct match.

That is, a first value 156(1) written to a first address 158(1) operates as a first password 108(1) causing the detection circuitry 154 to provide a first intermediate signal 160(1). Similarly, a second value 156(2) written to a second address 158(2) operates as a second password 108(2) causing the detection circuitry 154 to provide a second intermediate signal 160(2), and so on.

In some arrangements, the effective password length is extended fourfold to 128 bits by requiring the RF server 22 to correctly provide four predefined values 156 for four predefined addresses 158 of the shared memory 54. Upon receipt of all intermediate signals 160 indicating correct matching passwords 108, the output circuitry 154 outputs the activation signal 112 to transition the security processor 52 from the sleep mode to the wakened mode. Accordingly, in the context of an imposed password length of 128-bits, the output circuitry 154 outputs the activation signal 112 only when all four corresponding intermediate signals 160 indicate correct matches. Such an extended authentication requirement effectively prevents unauthorized activations of the security processor 52 (e.g., by rogue RF readers) that would unnecessarily drain down the local power source 62.

Other password lengths are suitable for use as well (e.g., 64-bits, 256-bits, etc.). With such augmentation of the effective password length using the specialized circuitry 150, the likelihood of an inadvertent or unauthorized wake up of the security processor 52 is reduced.

One-Time Passcodes (OTPs) for RF Server Authentication

Although the values and addresses required by the RF transceiver 50 of the RF tag 24 for proper authentication of the RF server are predefined or preprogrammed, it should be understood that these values and addresses preferably are not static. Rather, such values and addresses within the RF transceiver 50 are routinely updated by the security processor 52. As a result, an eavesdropper overhearing a prior wireless signal exchange between the RF server 22 and the RF tag 24 would be prevented from reusing the same values and addresses to authenticate at a later time.

Along these lines, the RF server 22 and the RF tag 24 are configured to periodically generate the same one-time passcodes (OTPs) based on a secret (e.g., a seed or key). The following function is suitable for use:

$$P_T = H(K_{TS}, C)$$ Equation (1)

where $H(\ )$ is a cryptographic function such as a block cipher, $K_{TS}$ is some secret key known to the RF server 22 and the RF tag 24, and at least a predetermined portion of C is a unique one-time value. As long as the RF server 22 and the RF tag 24 use the same values $K_{TS}$ and C, the RF server 22 and the RF tag 24 will generate the same value $P_T$ which can be used as the passwords 108 (also see FIGS. 2 and 4).

It should be understood that there a variety of sources for C which are concurrently available to both the RF server 22 (e.g., see the control circuitry 34 in FIG. 1) and the RF tag 24 (e.g., see the additional memory and support circuitry 66 in FIG. 2). One example is time, i.e., the predetermined portion of C is derived from the current time of day and/or the date. Another example is an event, i.e., the predetermined portion of C is derived from contents of counters which are synchronized and incremented concurrently in both the RF server 22 and the RF tag 24. Yet another example is a challenge-response, i.e., the predetermined portion of C is derived from previously received data from the RF server 22. A further example includes basing the predetermined portion of C on a previously agreed-upon cryptographic key or value derived therefrom (e.g., based on a secret/seed, a key or derived key, etc.) which is provided to the RF tag 24 from the RF server 22.

In some arrangements, the predetermined portion of C is derived from at least two of the above-identified sources, and/or perhaps other sources for added security (e.g., based on time and a key, based on a counter value and a key, etc.). In some arrangements, the key used to derive the predetermined portion of C is itself derived from prior keys for additional security.

Accordingly, only an RF server 22 with proper knowledge of $K_{TS}$ and C is able to wake up the security processor 52 of the RF tag 24. Moreover, once the security processor 52 wakes up (e.g., in response to proper authentication by the RF server 22, in response to a different event, periodically, etc.) the security processor 52 can rewrite the passwords 108 stored in the shared memory 54 in order to update the RF transceiver 50 to use different passwords 108 prior to transitioning from the wakened mode back to the low-power sleep mode.

Depending on the source for the predetermined portion of C, such dynamic reprogramming of the RF transceiver 50 by the security processor 52 may form part of the additional operations 114 illustrated in FIG. 3 (e.g., when the predetermined portion of C includes counter information). Additionally or alternatively, the security processor 52 may independently wake up and perform the password updates periodically (e.g., every 30 seconds, every minute, every hour, etc.) based on a clock event. Also, the security processor 52 may independently wake up and perform the password updates in response to other events (e.g., a button press by a user), and so on.

Since the RF server 22 is configured to generate the same OTP values on its end, the RF server 22 will use the new passwords 108 during a subsequent authentication operation. In the same manner, the RF server 22 and the RF tag 24 can periodically change the addresses of the shared memory 54 used for storing the passwords 108. Accordingly, such operation effectively thwarts attacks from an eavesdropper trying to use the previously overheard (but now discontinued and obsolete) passwords 108 since future activation requires new matching values and/or new matching addresses.

Throttling Wakeup Requests

The amount of time between successful wakeup attempts can be increased to further improve security (e.g., to increase the amount of time it would take an attacker to try all password combinations). Such throttling of wakeup attempts can be used in combination or instead of the earlier-described OTP techniques.

In some arrangements, the security processor 52 is configured to check the amount of time that has transpired since it last received an activation signal 112. If the time interval since the security processor 52 last awoke is less than a predetermined time threshold (e.g., 30 seconds, one minute, two minutes, etc.), the security processor 52 can be directed to automatically transition back to the low-power sleep mode without processing any incoming data from the RF server 22. However, if the time interval is greater than the predetermined time threshold, the security processor 52 remains awake to carry out useful operations (e.g., see FIG. 3).

The security processor 52 can compute this elapsed time value by simply calculating the difference between a previously stored wakeup time and a current time output from a clock (also see the additional memory and support circuitry 66 in FIG. 2). That is, during a first activation, the security processor 52 saves the time from the clock. Then, during the next activation, the security processor 52 calculates the difference between the saved time to the current time from the clock to determine the elapsed time.

In some arrangements, such throttling of wakeup attempts are performed by the RF transceiver 50 rather than the security processor 52. In these arrangements, the throttling operations preferably run on power from the RF reader 36 (FIG. 1) and thus do not drain the local power source 62 of the RF tag 24 (FIG. 2).

Tag Authentication

Some applications may require the RF tag 24 to authenticate itself to the RF server 22 for security purposes. For these applications, once the security processor 52 is in the wakened mode, the security processor 52 and the control circuitry 34 of the RF server 22 (FIG. 1) pass messages back and forth to achieve tag authentication, i.e., authentication of the RF tag 24 to the RF server 22.

In some arrangements, both the RF server 22 and the RF tag 24 use an authentication value such as an OTP for tag authentication, also see earlier-described Equation (1). That is, the RF server 22 and the RF tag 24 use a separate set of $K_{TS}$ and C values. The security processor 52 writes a locally generated authentication value to the shared memory 54 (also see the additional operations 114 in FIG. 3). Then, the RF transceiver 50 conveys that authentication value from the shared memory 54 to the RF server 22 (also see the additional operations 120 and 122 in FIG. 3). When the control circuitry 34 of the RF server 22 receives the authentication value from the RF tag 24, the control circuitry 34 validates the authentication value by an operation such as comparing the authentication value to an expected authentication value (e.g., a server-generated OTP) to authenticate the RF tag 24.

At this point, one will appreciate that multiple RF servers 22 can be supported by a single RF tag 24. That is, the RF reader 36 can identify itself by writing a unique identifier of the RF server 22 to the shared memory 54 (see messages 106 and 110 in FIG. 3). The security processor 52 can store different values for $K_{TS}$ and C corresponding to different RF server identifiers, and can thus provide back a specific OTP based on the particular RF server's identifier. Alternatively, the security processor 52 can include the particular RF server's identifier in the cryptographic function or a digital signature. In this way, the security processor 52 is capable of independently authenticating the RF tag 24 to a variety of RF servers 22.

Additionally, it should be understood that an RF server 22 is capable of exchanging wireless signals 44 with the RF tag 24 in a key establishment protocol. Along these lines, each newly-manufactured RF tag 24 is initially generic and sealed to prevent electrical probing. Furthermore, an attempt to penetrate the packaging of the RF tag 24 results in internal or self deactivation of the RF tag 24.

Nevertheless, using the above-described message-passing techniques, the RF server 22 is able to program a newly-manufactured RF tag 24, i.e., the key establishment protocol, also see Equation (1). Following successful completion, the RF server 22 provisions the RF tag 24 with a $K_{TS}$ value and perhaps other operating parameters and thus sets that RF tag 24 into operation. Accordingly, the security processor 52 is now configured to perform authentication operations with the RF server 22.

Transaction Signing

In addition to entity authentication, the RF tag 24 is capable of performing other operations such as transaction signing. Here, when the RF server 22 sends the RF server signal 106 (also see FIG. 3) to the RF tag 24, the RF server 22 includes transaction data D (or simply transaction) to be signed (e.g., to accept a shipment of EPC-labeled items). Optionally, the RF server 22 includes an RF server identifier to uniquely identify it among other RF servers 22. The RF transceiver 50 writes, among other things, the transaction and an indication that the transaction is to be signed, to a previously agreed-upon location of the shared memory 54 (message 110 in FIG. 3) and wakes up the security processor 52 (activation signal 112 in FIG. 3).

Preferably, the RF tag 24 outputs a prompt to a user that the transaction is ready to be signed. In some arrangements, the prompt is simple such as illumination of an LED or an audio tone (also see the additional memory and support circuitry 66 in FIG. 2). In other arrangements, the prompt is more robust such as rendering of text and/or graphics pertaining to the transaction on an LCD screen or a similar type of display.

The user is then able to respond to the prompt by signing the transaction (e.g., pressing a button, signing a tablet, etc.). In response, the security processor 52 is configured to (i) perform a cryptographic function (e.g., generate a message having an authentication code) and/or (ii) compute a digital signature (e.g., a public-key signature which includes the transaction and a secret key). The security processor 52 writes this information to a previously agreed-upon location in the shared memory 54 and notifies the RF transceiver 50 (see message 116 and signal 118 in FIG. 3). In turn, the RF transceiver 50 conveys the signed transaction back to the RF server 22 thus completing the transaction.

Writing Diagnostic and/or Sensor Data

As mentioned above, the RF tag 24 is capable of performing operations beyond authentication. In some arrangements, the RF tag 24 is constructed and arranged to store diagnostic and/or sensor data. In particular, the security processor 52 can obtain and store data in the shared memory 54 or in the additional memory and support circuitry 66 (FIG. 2) during routine operation (e.g., when woken by a successful RF reader authentication, when woken in response to an event, when periodically activated, etc.). Examples of diagnostic data include results of internal tests, periodically gathered status from operating in the field, and failure/fault information. Examples of sensor data include temperature readings, vibration data, pressure or gas readings, and accelerometer measurements.

This collected information can be useful in identifying a history for the RF tag 24 such as the security processor's serial number, the number of times the security processor 52 has been woken up by an RF reader 22, the number of times the security processor 52 has been reset, and so on. Such information may be helpful in understanding how often the RF tag 24 is used, and perhaps what happened if the RF tag 24 encounters a failure while operating in the field, among other things.

Additionally, when the RF tag 24 accompanies an item (e.g., on a box, attached to a pallet, in a shipping container or vehicle, etc.), the collected information can be useful in identifying a history of the item. For example, if the item perishes if stored outside a particular temperature range, the RF tag 24 can provide a temperature history indicative of a quality or state of the item.

During operation, the security processor 52 writes the data to predefined designated locations in the shared memory 54. Upon successful authentication with an RF reader 22, the RF transceiver 50 conveys this data to the RF reader 22 for further processing.

Battery-Powered Memory

It should be understood that it is possible to power the shared memory 54 from the local power source 62 (also see the dashed line 76 in FIG. 2). Here, a different protocol for RF reader authentication is available. In particular, the security processor 52 updates the RF transceiver 50 with new passwords 108 (e.g., 32-bit codes) by generating new OTPs and writing these OTPs in the form of new persistent values to particular addresses of the shared memory 54. To perform such updates, the security processor 52 wakes up and activates the shared memory 54 periodically such as in response to a timer (e.g., every 30 seconds, every minute, every five minutes, every hour, etc.) depending on the amount of power available from the local power source 62, and the desired lifetime of the local power source 62.

In order for the RF server 22 to authenticate itself to the RF tag 24, the control circuitry 34 of the RF server 22 must generate and present the correct OTP or set of OTPs to the RF transceiver 50 of the RF tag 24 through the RF reader 36. These arrangements are well-suited for time-based OTPs such as OTPs based on the time of day since the RF server 22 and the RF tag 24 preferably have convenient access to accurate internal clocks to maintain synchronization.

Further Details

Figure 5:
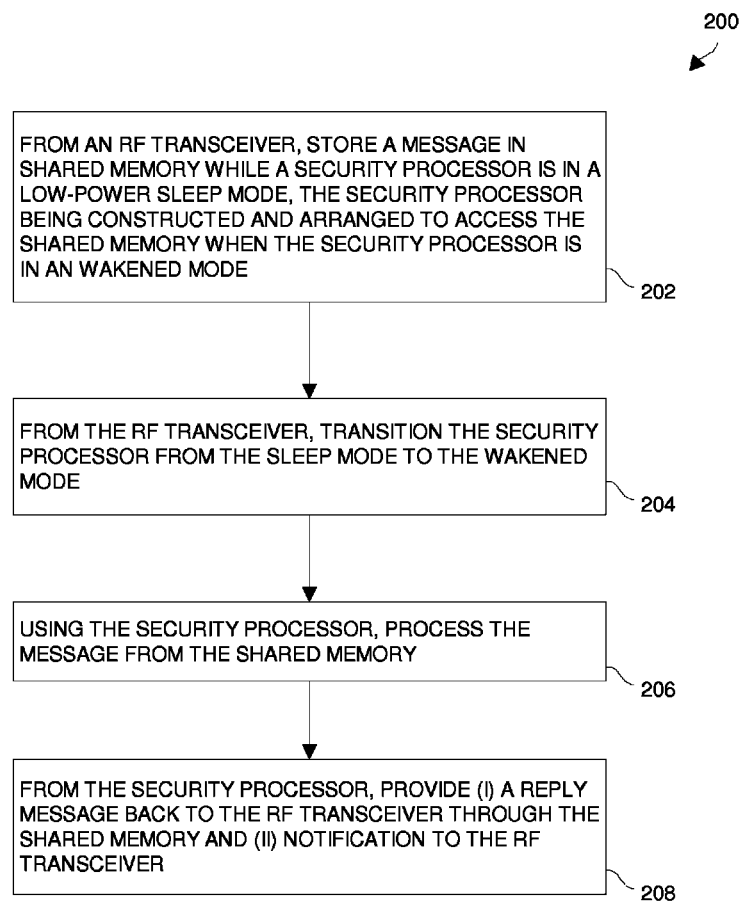
FIG. 5 is a flowchart of a procedure which is performed by the RF tag of FIG. 2.

FIG. 5 is a flowchart of a procedure 200 for carrying out message-passing between the RF transceiver 50 and the security processor 52 using the shared memory 54 (also see FIGS. 1 through 3). Although it is possible that the security processor 54 is in the wakened mode at the onset of an authentication attempt, procedure 200 presumes that the security processor 52 is currently in the low-power sleep mode.

In step 202, the RF transceiver 50 stores a message in the shared memory 54 (see arrow 110 in FIG. 3) while the security processor 54 is in the low-power sleep mode. In step 204, the RF transceiver 50 transitions the security processor 54 from the low-power sleep mode to the wakened mode (see arrow 112 in FIG. 3). In step 206, the security processor 54 reads and processes the message from the shared memory 54 (see arrow 114 in FIG. 3). In subsequent steps, i.e., block 208, the security processor 54 provides a reply message back to the RF transceiver 50 through the shared memory 54 as well as notification (see arrows 116 and 118 in FIG. 3). Accordingly, the shared memory 54 serves as a bidirectional communications pathway between the RF transceiver 50 and the security processor 52.

As mentioned above, an improved technique involves message-passing using shared memory 54 within an RF tag 24. In particular, an RF transceiver 50 within the RF tag 24 is able to derive power 40 from an external RF reader 36 and, based on interaction with the RF reader 36, store a message 56 in the shared memory 54 while a security processor 52 of the RF tag 24 resides in a low-power sleep mode. At some later time, the security processor 52 awakens from the low-power sleep mode (e.g., in response to an authenticated activation signal 112 from the RF transceiver 50) and processes the message 56 using power from a local power source 62 within the RF tag 24. Accordingly, the RF transceiver 50 and the security processor 52 are able to effectively communicate with each other thus enabling the RF tag 24 to enjoy processor capabilities (e.g., the security processor can perform cryptographically-strong authentication operations while awake and operating under power from the local power source). Moreover, since the security processor 52 eventually transitions back to the low-power sleep mode, the life of the local power source is extended thus enabling the RF tag 24 to operate effectively for many years.

While various embodiments of the invention have been particularly shown and described, it will be understood by those skilled in the art that various changes in form and details may be made therein without departing from the spirit and scope of the invention as defined by the appended claims.

For example, the RF tag 24 was described above as being equipped to handle reprogrammable passwords that are 32-bit in length by way of example only. In other arrangements, the RF tag 24 is constructed and arranged to process reprogrammable passwords of a length which is different than 32-bits (e.g., 16-bits, 64-bits, etc.).

Additionally, it should be understood that the message-passage techniques were described above in the context of EPC tags by way of example only. Other applications and operating environments are suitable for use as well such as in wireless authentication tokens (e.g., programming, using, debugging/trouble-shooting such tokens, etc.), smart cards and smart RFID tags, among others.

What is claimed is:

1. A method of message-passing using shared memory, the method comprising:
    storing a message in the shared memory while a security processor is in a sleep mode, the security processor being constructed and arranged to access the shared memory when the security processor is in a wakened mode;
    transitioning the security processor from the sleep mode to the wakened mode; and
    after the security processor has transitioned from the sleep mode to the wakened mode, processing the message from the shared memory using the security processor;

wherein:
- the method further comprises receiving the message from an external transmitter via local radio frequency (RF) transceiver circuitry while the security processor is in the sleep mode;
- the method is performed by an RF tag device comprising, within an enclosed housing, the local RF transceiver circuitry, the shared memory, and the security processor;
- when the security processor is in the sleep mode, the security processor is in an inactive unpowered state;
- the message includes a password;
- storing is performed in response to receiving if and only if the password matches an expected password;
- storing includes storing a particular value in a particular address of the shared memory while the security processor is in the sleep mode;
- transitioning the security processor to the wakened mode from the sleep mode is performed in response to detecting that the particular value has been stored in the particular address of the shared memory;
- when the security processor is in the wakened mode, the security processor is in an operative powered state in which the security processor is configured to be able to read from and write to the shared memory;
- the password includes a memory address and a value to be stored at the memory address; and
- the password matches the expected password if and only if:
  - the memory address matches the particular memory address; and
  - the value to be stored at the memory address matches the particular address of the shared memory.

2. A method of message passing using shared memory, the method comprising:
- storing a message in the shared memory while a security processor is in a sleep mode, the security processor being constructed and arranged to access the shared memory when the security processor is in a wakened mode;
- transitioning the security processor from the sleep mode to the wakened mode; and
- after the security processor has transitioned from the sleep mode to the wakened mode, processing the message from the shared memory using the security processor;
- wherein the shared memory and the security processor form part of a radio frequency (RF) tag device, the RF tag device further including an RF transceiver circuit and a battery;
- wherein the RF transceiver circuit is constructed and arranged to derive power from an external reader when the RF tag device is moved proximate to the external reader;
- wherein the security processor is constructed and arranged to derive power from the battery; and
- wherein storing the message in the shared memory while the security processor is in the sleep mode includes writing the message into the shared memory by the RF transceiver circuit while (i) the RF transceiver derives power from the external reader and (ii) the security processor remains in the sleep mode to conserve power of the battery;
- wherein transitioning the security processor from the sleep mode to the wakened mode includes:
  - detecting that an activation event has occurred when the RF transceiver circuit obtains, from the external reader, a predefined set of values and a predefined set of addresses of the shared memory and writes the predefined set of values to the predefined set of addresses of the shared memory, and
  - outputting a wakeup signal to wake UP the security processor in response to detection of the activation event;
- wherein the method further comprises, while the shared memory and the security processor derive power from the battery, generating a local one-time passcode (OTP) and reprogramming the RF transceiver to (i) discontinue use of the predefined set of values and the predefined set of addresses, (ii) detect that a new activation event has occurred when the RF transceiver circuit obtains, from the external reader, a new predefined set of values and a new predefined set of addresses of the shared memory and writes the new predefined set of values to the new predefined set of addresses of the shared memory, the new predefined set of values and the new predefined set of addresses being based on the local OTP, and (iii) output a new wakeup signal to wake UP the security processor in response to detection of the new activation event.

3. A method as in claim 2 wherein processing the message from the shared memory using the security processor after the security processor has transitioned from the sleep mode to the wakened mode includes:
- reading the message from the shared memory by the security processor while (i) the shared memory derives power from the external reader through the RF transceiver circuit and (ii) the security processor derives power from the battery.

4. A method as in claim 2 wherein processing the message from the shared memory using the security processor after the security processor has transitioned from the sleep mode to the wakened mode includes:
- reading the message from the shared memory by the security processor while both the shared memory and the security processor derive power from the battery.

5. A method of message passing using shared memory, the method comprising:
- storing a message in the shared memory while a security processor is in a sleep mode, the security processor being constructed and arranged to access the shared memory when the security processor is in a wakened mode;
- transitioning the security processor from the sleep mode to the wakened mode; and
- after the security processor has transitioned from the sleep mode to the wakened mode, processing the message from the shared memory using the security processor;
- wherein the shared memory and the security processor form part of a radio frequency (RF) tag device, the RF tag device further including an RF transceiver circuit and a battery;
- wherein the RF transceiver circuit is constructed and arranged to derive power from an external reader when the RF tag device is moved proximate to the external reader;
- wherein the security processor is constructed and arranged to derive power from the battery;
- wherein storing the message in the shared memory while the security processor is in the sleep mode includes writing the message into the shared memory by the RF transceiver circuit while (i) the RF transceiver derives power from the external reader and (ii) the security processor remains in the sleep mode to conserve power of the battery;

wherein transitioning the security processor from the sleep mode to the wakened mode includes:
  detecting that an activation event has occurred when the RF transceiver circuit obtains, from the external reader, a predefined set of values and a predefined set of addresses of the shared memory and writes the predefined set of values to the predefined set of addresses of the shared memory, and
  outputting a wakeup signal to wake UP the security processor in response to detection of the activation event;
wherein the RF transceiver circuit includes a detection circuit and an output circuit coupled to the detection circuit, the detection circuit being constructed and arranged to provide intermediate detection signals in response to certain predefined values being written to certain predefined 32-bit addresses of the shared memory;
wherein detecting that the activation event has occurred includes the detection circuit providing a first intermediate detection signal in response to a first predefined value being written to a first predefined 32-bit address of the shared memory and a second intermediate detection signal in response to a second predefined value being written to a second predefined 32-bit address of the shared memory, the first predefined 32-bit address being different from the second predefined 32-bit address; and
wherein outputting the wakeup signal to wake UP the security processor includes sending, from the output circuit to the security processor, the wakeup signal after the output circuit receives both the first and second detection signals from the detection circuit to impose an authentication requirement on the external reader which is more than 32-bits;
wherein the method further comprises:
  dynamically reprogramming, by the security processor, the detection circuit to (i) discontinue providing the first intermediate detection signal in response to the first predefined value being written to the first predefined 32-bit address of the shared memory and the second intermediate detection signal in response to the second predefined value being written to the second predefined 32-bit address of the shared memory, and (ii) provide the first intermediate detection signal in response to a third predefined value being written to a third predefined 32-bit address of the shared memory and the second intermediate detection signal in response to a fourth predefined value being written to a fourth predefined 32-bit address of the shared memory.

6. A method as in claim 5 wherein at least a portion of each predefined value and at least a portion of each predefined 32-bit address is based on at least two of (i) a current time value, (ii) a strictly increasing counter value, (iii) a value previously received from the external reader, and (iv) a previously agreed-upon cryptographic key;
  wherein a server is connected to the external reader; and
  wherein the server and the security processor are constructed and arranged to synchronously and independently compute each predefined value and each predefined 32-bit address.

7. A method as in claim 2, further comprising:
in response to transitioning from the sleep mode to the wakened mode, the security processor generating an elapsed time value which represents an amount of time that has elapsed since the security processor transitioned to the sleep mode from the wakened mode,
  automatically transitioning from the wakened mode back to the sleep mode when the elapsed time value is less than a predetermined time threshold, and
  automatically remaining in the wakened mode to perform a security operation when the elapsed time value exceeds the predetermined time threshold.

8. A method as in claim 2, further comprising:
generating a local authentication value and storing the local authentication value in the shared memory by the security processor to enable the external reader to obtain the local authentication value from the shared memory through the RF transceiver circuit to authenticate the RF tag device.

9. A method as in claim 8 wherein the message includes a server identifier which uniquely identifies a particular server among multiple servers; and wherein processing the message from the shared memory using the security processor includes:
  forming, as the local authentication value, a particular authentication value which is uniquely specific to the particular server based on the server identifier.

10. A method as in claim 8 wherein the message includes a key establishment value; and wherein processing the message from the shared memory using the security processor includes:
  configuring the security processor to perform subsequent authentication operations based on the key establishment value.

11. A method as in claim 1 wherein the security processor couples to a display and an input circuit;
  wherein the message includes a transaction;
  wherein processing the message from the shared memory using the security processor includes (i) on the display, prompting a user to electronically sign the transaction, and (ii) from the input circuit, receiving a transaction response from the user and storing the transaction response in the shared memory;
  wherein the transaction response is subsequently conveyed to an external reader through an RF transceiver coupled to the shared memory; and
  wherein the transaction response indicates whether the user has electronically signed the transaction.

12. A method as in claim 1 wherein the message includes a data request; and wherein processing the message from the shared memory using the security processor includes:
  writing data from the security processor to the shared memory in response to the data request, the data being subsequently obtained from the shared memory by an external reader through a radio frequency (RF) transceiver device.

13. A radio frequency (RF) tag device, comprising:
an RF transceiver circuit;
a security processor;
a battery coupled to the security processor; and
shared memory which is accessible by the RF transceiver circuit and by the security processor;
the RF transceiver circuit being constructed and arranged to receive and store a message in the shared memory regardless of whether the security processor is in a sleep mode or a wakened mode;
the security processor being constructed and arranged to (i) transition between a sleep mode to a wakened mode, and (ii) access the message from the shared memory after the security processor has transitioned from the sleep mode to the wakened mode;

wherein the RF transceiver circuit is constructed and arranged to derive power from an external reader when the RF tag device is moved proximate to the external reader;

wherein the security processor is constructed and arranged to derive power from the battery;

wherein the RF transceiver circuit is constructed and arranged to, when storing the message in the shared memory, write the message into the shared memory while (i) the RF transceiver derives power from the external reader and (ii) the security processor remains in the sleep mode to conserve power of the battery;

wherein the RF transceiver circuit is constructed and arranged to:
  detect that an activation event has occurred when the RF transceiver circuit obtains, from the external reader, a predefined set of values and a predefined set of addresses of the shared memory and writes the predefined set of values to the predefined set of addresses of the shared memory, and
  output a wakeup signal to wake UP the security processor in response to detection of the activation event; and wherein the security processor is further constructed and arranged to, while the shared memory and the security processor derive power from the battery, generate a local one-time passcode (OTP) and reprogram the RF transceiver to (i) discontinue use of the predefined set of values and the predefined set of addresses, (ii) detect that a new activation event has occurred when the RF transceiver circuit obtains, from the external reader, a new predefined set of values and a new predefined set of addresses of the shared memory and writes the new predefined set of values to the new predefined set of addresses of the shared memory, the new predefined set of values and the new predefined set of addresses being based on the local OTP, and (iii) output a new wakeup signal to wake up the security processor in response to detection of the new activation event.

14. A radio frequency (RF) tag system, comprising:
an RF server; and
an RF tag device constructed and arranged to exchange messages with the RF tag server in a wireless manner; the RF tag device including an RF transceiver circuit, a security processor, a battery coupled to the security processor of the RF tag device, and shared memory;
the RF transceiver circuit being constructed and arranged to receive a message from the RF server and store the message in the shared memory regardless of whether the security processor is in a sleep mode or a wakened mode; and
the security processor being constructed and arranged to (i) transition between a sleep mode to a wakened mode, and (ii) access the message from the shared memory after the security processor has transitioned from the sleep mode to the wakened mode;
wherein the RF transceiver circuit of the RF tag device is constructed and arranged to derive power from the external reader of the RF server when the RF tag device is moved proximate to the external reader;
wherein the security processor of the RF tag device is constructed and arranged to derive power from the battery of the RF tag device; and
wherein the RF transceiver circuit of the RF tag device is constructed and arranged to, when receiving and storing the message from the RF server in the shared memory, write the message into the shared memory while (i) the RF transceiver derives power from the external reader and (ii) the security processor remains in the sleep mode to conserve power of the battery;

wherein the RF transceiver circuit is constructed and arranged to:
  detect that an activation event has occurred when the RF transceiver circuit obtains, from the external reader, a predefined set of values and a predefined set of addresses of the shared memory and writes the predefined set of values to the predefined set of addresses of the shared memory, and
  output a wakeup signal to wake UP the security processor in response to detection of the activation event; and wherein the security processor is further constructed and arranged to, while the shared memory and the security processor derive power from the battery, generate a local one-time passcode (OTP) and reprogram the RF transceiver to (i) discontinue use of the predefined set of values and the predefined set of addresses, (ii) detect that a new activation event has occurred when the RF transceiver circuit obtains, from the external reader, a new predefined set of values and a new predefined set of addresses of the shared memory and writes the new predefined set of values to the new predefined set of addresses of the shared memory, the new predefined set of values and the new predefined set of addresses being based on the local OTP, and (iii) output a new wakeup signal to wake up the security processor in response to detection of the new activation event.

15. A method of message passing using shared memory, the method comprising:
storing a message in the shared memory while a security processor is in a sleep mode, the security processor being constructed and arranged to access the shared memory when the security processor is in a wakened mode;
transitioning the security processor from the sleep mode to the wakened mode; and
after the security processor has transitioned from the sleep mode to the wakened mode, processing the message from the shared memory using the security processor;
wherein:
  the method further comprises receiving the message from an external transmitter via local radio frequency (RF) transceiver circuitry while the security processor is in the sleep mode;
  the method is performed by an RF tag device comprising, within an enclosed housing, the local RF transceiver circuitry, the shared memory, and the security processor;
  when the security processor is in the sleep mode, the security processor is in an inactive unpowered state;
  the message includes a password;
  storing is performed in response to receiving if and only if the password matches an expected password;
  storing includes storing a particular value in a particular address of the shared memory while the security processor is in the sleep mode;
  transitioning the security processor to the wakened mode from the sleep mode is performed in response to detecting that the particular value has been stored in the particular address of the shared memory;
  when the security processor is in the wakened mode, the security processor is in an operative powered state in which the security processor is configured to be able to read from and write to the shared memory;

the method further includes:
- receiving a wireless energy transfer at the local RF transceiver circuitry from the external transmitter while the security processor is in the sleep mode;
- in response to receiving the wireless energy transfer, transmitting an identification code uniquely associated with the RF tag device via the local RF transceiver circuitry while the security processor is in the sleep mode; and
- receiving the message is performed in response to transmitting the identification code; and the password matches the expected password only if the password is a cryptographic combination of the identification code uniquely associated with the RF tag device and a secret known only to authorized devices.

* * * * *